(12) United States Patent
Kato et al.

(10) Patent No.: US 10,291,058 B2
(45) Date of Patent: May 14, 2019

(54) PORTABLE DEVICE AND PORTABLE TIMEPIECE

(71) Applicant: Seiko Instruments Inc., Chiba-shi, Chiba (JP)

(72) Inventors: Teruo Kato, Chiba (JP); Yasunori Hara, Chiba (JP); Tamotsu Maesawa, Chiba (JP); Dai Terasawa, Chiba (JP); Hideki Okuda, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 145 days.

(21) Appl. No.: 15/450,626

(22) Filed: Mar. 6, 2017

(65) Prior Publication Data

US 2017/0261943 A1  Sep. 14, 2017

(30) Foreign Application Priority Data

Mar. 8, 2016 (JP) .................. 2016-044682

(51) Int. Cl.
*H02J 7/02* (2016.01)
*G04B 37/14* (2006.01)
*G04G 19/00* (2006.01)
*G04C 10/00* (2006.01)
*G04G 17/04* (2006.01)
*G04G 21/04* (2013.01)
*H02J 50/10* (2016.01)

(52) U.S. Cl.
CPC .......... *H02J 7/025* (2013.01); *G04B 37/1486* (2013.01); *G04C 10/00* (2013.01); *G04G 17/04* (2013.01); *G04G 19/00* (2013.01); *G04G 21/04* (2013.01); *H02J 50/10* (2016.02)

(58) Field of Classification Search
CPC ..... G04G 19/00; G04B 37/1486; H02J 50/10; H02J 7/025; H02J 50/70; Y02B 40/90
See application file for complete search history.

(56) References Cited

U.S. PATENT DOCUMENTS

2015/0123604 A1* 5/2015 Lee .................. H01F 38/14
320/108
2017/0040825 A1* 2/2017 Cavallaro ............... H02J 7/025

FOREIGN PATENT DOCUMENTS

JP  2011-160501 A  8/2011

* cited by examiner

*Primary Examiner* — Carlos D Amaya
(74) *Attorney, Agent, or Firm* — Brinks Gilson & Lione (57) ABSTRACT

A portable timepiece includes a case, a power receiving coil accommodated in the case, a bypass member configured to include a soft magnetic material, and a first band that is internally equipped with the bypass member, and that is transformable so as to dispose the bypass member between the power receiving coil and a charging device when charging is performed using the charging device.

10 Claims, 9 Drawing Sheets

PORTABLE DEVICE AND PORTABLE TIMEPIECE

RELATED APPLICATIONS

This application claims priority under 35 U.S.C. § 119 to Japanese Patent Application No. 2016-044682 filed on Mar. 8, 2016, the entire content of which is hereby incorporated by reference.

BACKGROUND OF THE INVENTION

Field of the Invention

The present invention relates to a portable device and a portable timepiece.

Background Art

In a portable timepiece such as a wristwatch and a pocket watch or a portable device such as a stopwatch, a cellular phone, and a portable information terminal, a non-contact charging method has been widely introduced in which a charger is not directly connected by a wire and electromagnetic induction is alternatively utilized, for example. The non-contact charging method employs a power supply coil disposed in the charger for non-contact charging and a power receiving coil disposed inside a housing of the portable device.

For example, the charger used for the non-contact charging method in this way includes the power supply coil and a cover plate. For example, the portable device has the power receiving coil incorporated inside the housing. If the portable device is brought close to the cover plate in a state where electricity is supplied to the power supply coil of the charger, the electromagnetic induction is generated between the power supply coil and the power receiving coil, thereby generating power (induced electromotive force) on the power receiving coil side. In the portable device, a storage battery incorporated in the portable device is charged with the power generated in the power receiving coil.

In order to perform charging by using the non-contact charging method, it is preferable to bring the power supply coil and the power receiving coil close to each other. In the related art, JP-A-2011-160501 discloses an electronic device (charger) having improved charging efficiency. The electronic device includes a second coil (power supply coil). The second coil is magnetically coupled with a first coil (power receiving coil) disposed in a band portion extending in a horizontal direction of a timepiece main body of a wristwatch (portable device). The electronic device includes a positioning recess for positioning the band portion of the wristwatch. In order to charge a capacitor disposed in the wristwatch, the band portion is positioned in the positioning recess, and the charging is performed in a state where the first coil and the second coil are brought close to each other.

Incidentally, in recent years, the charger has been installed in a place other than a fixed charging place such as a user's house, and various types have been installed as the charger. Therefore, it is necessary to provide a portable device whose charging efficiency can be improved even if the portable device is charged using various chargers. However, according to the electronic device disclosed in JP-A-2011-160501, the capacitor of the wristwatch is charged after the band attached to the wristwatch is positioned in the positioning recess in the electronic device. Therefore, even if non-contact charging has to be performed on the wristwatch by using another electronic device, a charging device and a power receiving coil are less likely to be aligned with each other. Consequently, it is difficult to improve charging efficiency.

SUMMARY OF THE INVENTION

Therefore, an advantage of some aspects of the present invention is to provide a portable device and a portable timepiece which can improve charging efficiency in non-contact charging, even in a case where a charging device and a power receiving coil are less likely to be aligned with each other.

According to an aspect of the present invention, a portable device includes a case, a power receiving unit accommodated in the case, a bypass member configured to include a soft magnetic material, and an accessory member that is internally equipped with the bypass member, and that is transformable so as to dispose the bypass member between the power receiving unit and a charging device when charging is performed using the charging device.

The soft magnetic material included in the bypass member has a weak coercive force and high magnetic permeability. Therefore, if the bypass member is disposed between the power receiving unit and the charging device, electromagnetic induction is strengthened when power is supplied to the charging device. Accordingly, it is possible to increase an induced electromotive force generated in the power receiving unit. Thus, since the bypass member is disposed between the power receiving unit and the charging device, charging efficiency can be improved. The bypass member is disposed in the accessory member that is transformable so as to dispose the bypass member between the power receiving unit and the charging device. Therefore, the bypass member can be disposed at a position where the induced electromotive force increases between the power receiving unit and the charging device. Accordingly, even in a case where the charging device and the power receiving coil are less likely to be aligned with each other, charging efficiency can be improved in non-contact charging.

In the above-described portable device, the power receiving unit may include a power receiving coil that is formed on a surface along a facing surface which faces the charging device in the case, and that has an opening portion formed in the center. When the charging is performed using the charging device, the accessory member may be transformable so as to dispose the bypass member at a position where the bypass member and the power receiving unit do not overlap each other when viewed in an axial direction orthogonal to the facing surface.

According to the above-described portable device, the accessory member is transformable so as to dispose the bypass member at the position where the bypass member and the power receiving unit do not overlap each other during a charging period. Since the bypass member can be disposed at the position where the bypass member and the power receiving unit do not overlap each other during the charging period, it is possible to further strengthen the electromagnetic induction between the power receiving unit and the charging device. Accordingly, the charging efficiency can be further improved in the non-contact charging.

In the above-described portable device, the accessory member may be transformable so as to dispose the bypass member in the opening portion formed in the center of the power receiving coil and an outer edge portion of the power receiving coil.

According to the above-described portable device, the accessory member is transformable so as to dispose the bypass member in the opening portion formed in the center of the power receiving coil and the outer edge portion of the power receiving coil during a charging period. Since the bypass member is disposed in the opening portion formed in the center of the power receiving coil and the outer edge portion of the power receiving coil, it is possible to further strengthen the electromagnetic induction between the power receiving unit and the charging device. Accordingly, the charging efficiency can be further improved in the non-contact charging.

According to another aspect of the present invention, a portable timepiece includes a timepiece main body, a power receiving unit accommodated on a rear surface side in the timepiece main body, a bypass member configured to include a soft magnetic material, and an accessory member that is attached to the timepiece main body, that is internally equipped with the bypass member, and that is transformable so as to dispose the bypass member between the power receiving unit and a charging device when charging is performed using the charging device.

According to the above-described portable timepiece, since the bypass member including the soft magnetic material is disposed between the power receiving unit and the charging device, the charging efficiency can be improved. The bypass member is disposed in the accessory member which is transformable so as to dispose the bypass member between the power receiving unit and the charging device. Therefore, the bypass member can be disposed at a position where the induced electromotive force increases between the power receiving unit and the charging device. Accordingly, even in a case where the charging device and the power receiving coil are less likely to be aligned with each other, the charging efficiency can be improved in the non-contact charging.

In the above-described portable timepiece, the accessory member may be a band including a transformation portion that is transformable so as to dispose the bypass member at a position along the power receiving unit.

According to the above-described portable timepiece, the accessory member is transformable so as to dispose the bypass member at the position along the power receiving unit. Therefore, the bypass member can be easily disposed at a position where the induced electromotive force increases between the power receiving unit and the charging device.

In the above-described portable timepiece, the accessory member may be a first free ring and a second free ring which are attached to the band so as to be movable along the band attached to the timepiece main body, and which are transformed by a mutual clearance therebetween being changed.

According to the above-described portable timepiece, the first free ring and the second free ring are internally equipped with the bypass member. Therefore, the bypass member can be easily disposed between the power receiving unit and the charging device. The first free ring and the second free ring are transformed by the mutual clearance therebetween being changed. Accordingly, even in a case where non-contact charging is performed using the charging devices which have respectively various shapes, the charging efficiency can be improved.

The above-described portable timepiece may further include a projection portion that is disposed in at least any one of the first free ring and the second free ring, and a stationary hole that is formed in the band, into which the projection portion can be inserted and fitted, and that is disposed between the power receiving unit and the charging device when the charging is performed using the charging device.

According to the above-described portable timepiece, the projection portion is disposed in at least any one of the first free ring and the second free ring. The stationary hole disposed between the power receiving unit and the charging device when the charging is performed using the charging device is formed in the band. Therefore, when the charging is performed using the charging device, the first free ring or the second free ring can be reliably disposed at a desired position between the power receiving unit and the charging device.

In the above-described portable timepiece, the accessory member may be a strap-like band attached to the timepiece main body.

According to the above-described portable timepiece, since the accessory member is the strap-like band, the accessory member is easily transformable. Therefore, the bypass member can be easily disposed at a desired position between the power receiving unit and the charging device.

In the above-described portable timepiece, the power receiving unit may include a power receiving coil that is formed on a surface along a facing surface which faces the charging device in the timepiece main body, and that has an opening portion formed in the center. When the charging is performed using the charging device, the accessory member may be transformable so as to dispose the bypass member at a position where the bypass member and the power receiving unit do not overlap each other when viewed in an axial direction orthogonal to the facing surface.

According to the above-described portable timepiece, during a charging period, the bypass member can be disposed at the position where the bypass member and the power receiving unit do not overlap each other. Accordingly, the charging efficiency can be further improved in the non-contact charging.

In the above-described portable timepiece, the accessory member may be transformable so as to dispose the bypass member in the opening portion formed in the center of the power receiving coil and an outer edge portion of the power receiving coil.

According to the above-described portable timepiece, during a charging period, the bypass member can be disposed in the opening portion formed in the center of the power receiving coil and the outer edge portion of the power receiving coil. Accordingly, the charging efficiency can be further improved in the non-contact charging.

According to a portable device and a portable timepiece in the present invention, it is possible to provide a portable device and a portable timepiece which can improve charging efficiency in non-contact charging, even in a case where a charging device and a power receiving coil are less likely to be aligned with each other.

DETAILED DESCRIPTION OF THE INVENTION

Next, embodiments according to the present invention will be described with reference to the drawings. In the following description of each embodiment, the same reference numerals will be given to those which have a common function, and description thereof will be omitted.

First Embodiment

Figure 1:
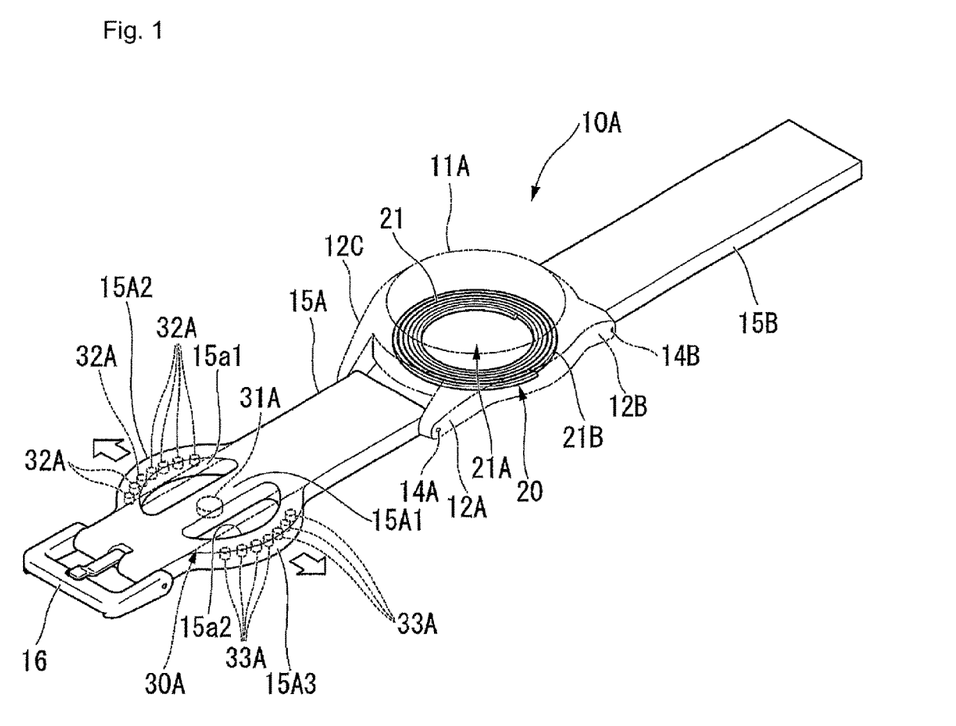
FIG. 1 is a perspective view of a portable timepiece according to a first embodiment.
Figure 2A:
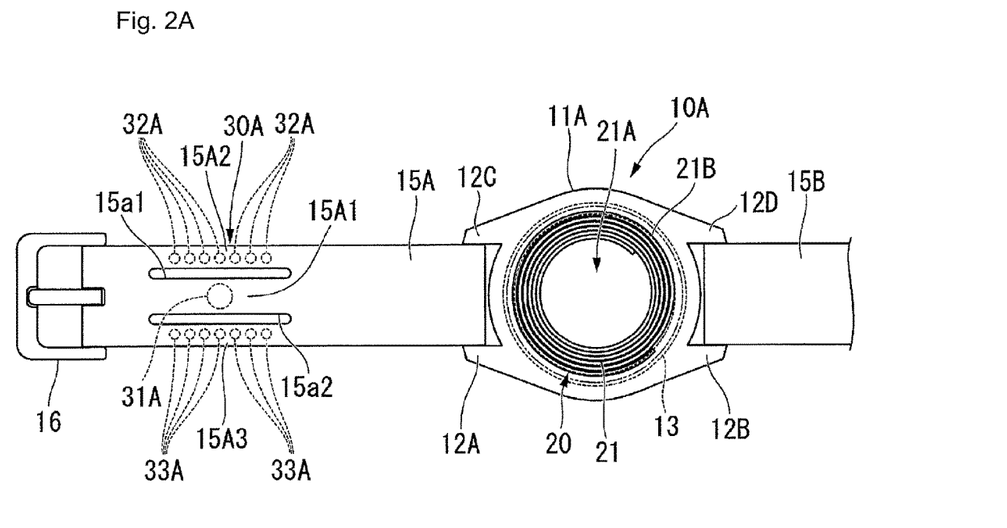
FIG. 2A is a plan view before the portable timepiece according to the first embodiment is transformed.
Figure 2B:
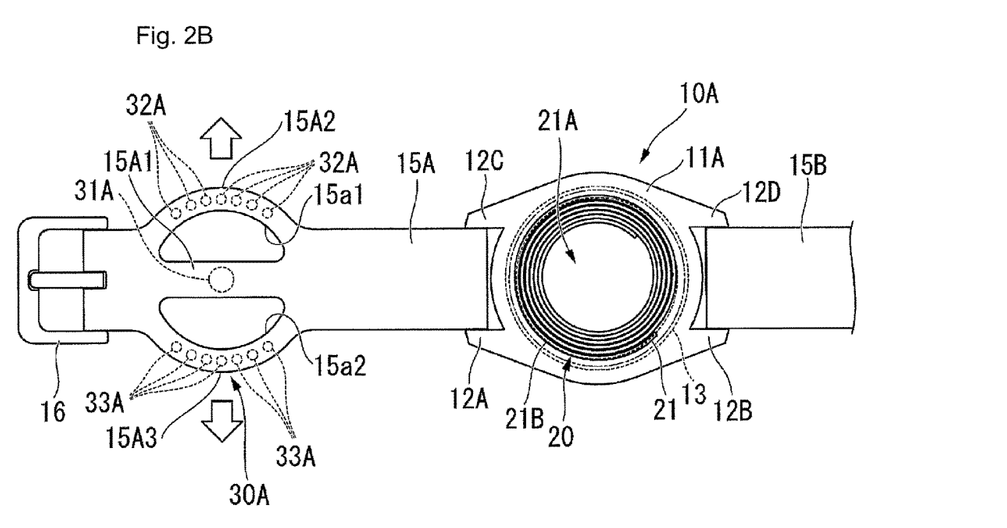
FIG. 2B is a plan view after the portable timepiece is transformed.

First, a first embodiment will be described.
1-1. Configuration of Portable Timepiece
FIG. 1 is a perspective view of a portable timepiece according to the first embodiment. FIG. 2A is a plan view before the portable timepiece according to the first embodiment is transformed, and FIG. 2B is a plan view after the portable timepiece is transformed. As illustrated in FIGS. 1 to 2B, a portable timepiece 10A serving as an example of a portable device according to the present invention includes a case 11A serving as an example of a timepiece main body according to the present invention. A display device such as a liquid crystal display panel is disposed on a front surface of the case 11A, and displays time information. A movement is incorporated in the case 11A. The movement includes a drive unit and a battery (storage battery), and controls display information displayed on the display device.

Bows 12A to 12D are respectively formed in both end portions of the case 11A. An opening portion is formed on a rear surface side of the case 11A. A case back 13 is attached to the opening portion. The case back 13 closes the opening portion. A first band 15A serving as an example of an accessory member and a band according to the present invention is attached to the bows 12A and 12C in one end by using a first pin 14A. A second band 15B is attached to the bows 12B and 12D in the other end by using a second pin 14B. A buckle 16 is disposed in an end portion opposite to a side to which the case 11A is attached in the first band 15A.

An antenna 20 is disposed inside the case 11A. The antenna 20 includes a power receiving coil 21 serving as an example of a power receiving unit according to the present invention, and an electromagnetic shield 22 (refer to FIG. 3). The power receiving coil 21 is disposed at a position close to the case back 13. Here, a surface opposite to an exposure surface which is exposed outward when the case back 13 is assembled to the case 11A is defined as a rear surface of the case back 13. The power receiving coil 21 is disposed on a surface along the rear surface of the case back 13 which serves as an example of a facing surface according to the present invention. The surface along the rear surface of the case back 13 is substantially parallel to the rear surface of the case back 13.

The power receiving coil 21 has a spiral shape when viewed in a vertical direction. In the following description, an axial direction orthogonal to the rear surface of the case back 13 is referred to as the vertical direction. A central opening portion 21A serving as an example of an opening portion according to the present invention is formed in the center of the power receiving coil 21 when viewed in the vertical direction. An outer edge portion 21B of the power receiving coil 21 is an example of an outer edge portion according to the present invention.

Figure 3:
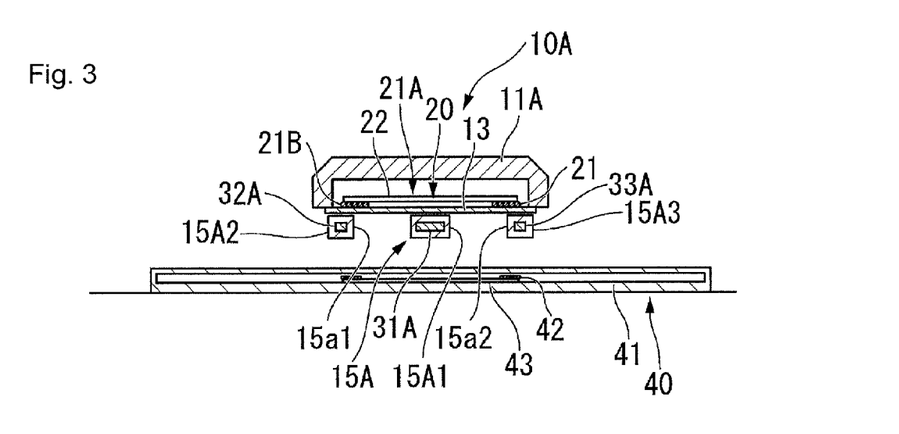
FIG. 3 is a front sectional view illustrating a charging state of the portable timepiece according to the first embodiment.

As illustrated in FIG. 3, the electromagnetic shield 22 is disposed on a side opposite to the case back 13 across the power receiving coil 21. The electromagnetic shield 22 covers a substantially entire body of the power receiving coil 21. A storage battery (not illustrated) incorporated in the case 11A is mounted on the electromagnetic shield 22.

The electromagnetic shield 22 restrains a magnetic force line passing through the power receiving coil 21 from leaking upward. Power generated in the power receiving coil 21 is supplied to the storage battery. The storage battery stores the supplied power. The power for generating a drive force to drive the drive unit of the movement is supplied to the movement by the storage battery.

The first band 15A is formed of a flexible material. As illustrated in FIGS. 1 to 2B, the first band 15A includes a first bypass accommodation unit 15A1, a second bypass accommodation unit 15A2, and a third bypass accommodation unit 15A3 which serve as an example of a transformation portion according to the present invention. The first bypass accommodation unit 15A1 is disposed at a position interposed between the second bypass accommodation unit 15A2 and the third bypass accommodation unit 15A3. A first slit 15a1 is formed between the first bypass accommodation unit 15A1 and the second bypass accommodation unit 15A2. A second slit 15a2 is formed between the first bypass accommodation unit 15A1 and the third bypass accommodation unit 15A3.

Both the second bypass accommodation unit 15A2 and the third bypass accommodation unit 15A3 are transformable along the outer edge portion 21B of the power receiving coil 21. The second bypass accommodation unit 15A2 and the third bypass accommodation unit 15A3 are transformed so as to spread in a direction intersecting an extending direction of the first band 15A when both of these are transformed.

As illustrated in FIG. 2A, the second bypass accommodation unit 15A2 and the third bypass accommodation unit 15A3 have a straight line shape when both of these are not transformed. In this case, both the second bypass accommodation unit 15A2 and the third bypass accommodation unit 15A3 are disposed along the extending direction of the first band 15A. Therefore, the first bypass accommodation unit 15A1, the second bypass accommodation unit 15A2, and the third bypass accommodation unit 15A3 are disposed substantially parallel to each other.

During the transformation as illustrated in FIG. 2B, the second bypass accommodation unit 15A2 and the third bypass accommodation unit 15A3 have an arc shape when viewed in the vertical direction. At this time, the second bypass accommodation unit 15A2 and the third bypass accommodation unit 15A3 are disposed along an arc whose center is one point on the first bypass accommodation unit 15A1. Any planar shape of the first slit 15a1 and the second slit 15a2 during the transformation of the second bypass accommodation unit 15A2 and the third bypass accommodation unit 15A3 is a substantially semicircular shape.

An accessory can be inserted into the first slit 15a1 and the second slit 15a2 having substantially the semicircular shape during the transformation of the second bypass accommodation unit 15A2 and the third bypass accommodation unit 15A3. Since the accessory is inserted into the first slit 15a1 and the second slit 15a2 having substantially the semicircular shape, the shape of the second bypass accommodation unit 15A2 and the third bypass accommodation unit 15A3 during the transformation is maintained.

The accessory can be inserted into the first slit 15a1 and the second slit 15a2 which are illustrated in FIG. 2B. The accessory is a member which is transformed into a substantially semicircular shape by separating the first slit 15a1 and the second slit 15a2 away from each other. The shape of the accessory inserted into the first slit 15a1 is a tapered shape in which the first slit 15a1 is tapered and the width increases as the shape goes away from the first slit 15a1. In a plane cross section of the accessory, the widest portion has a substantially semicircular shape. The accessory is inserted into the first slit 15a1, thereby transforming the first slit 15a1 into substantially the semicircular shape. The accessory which can be inserted into the second slit 15a2 can employ the same shape.

The first band 15A accommodates a bypass member 30A serving as an example of a bypass member according to the present invention. Specifically, the first bypass accommodation unit 15A1 is internally equipped with the first bypass 31A. The second bypass accommodation unit 15A2 and the third bypass accommodation unit 15A3 are respectively and internally equipped with multiple (here, seven) second bypasses 32A and third bypasses 33A. The multiple second bypasses 32A are disposed separate from each other at substantially equal intervals along the extending direction of the second bypass accommodation unit 15A2. Similarly, the multiple third bypasses 33A are disposed separate from each other at substantially equal intervals along the extending direction of the third bypass accommodation unit 15A3.

During the transformation of the second bypass accommodation unit 15A2 and the third bypass accommodation unit 15A3, the multiple second bypasses 32A and third bypasses 33A are arrayed on an arc whose center is the first bypass 31A. In this state, a clearance between the first bypass 31A and the second bypass 32A is substantially the same as a clearance between the first bypass 31A and the third bypass 33A. A distance between the second bypass 32A and the third bypass 33A which face each other is substantially the same as a diameter of the power receiving coil 21.

All of the first bypass 31A, the second bypass 32A, and the third bypass 33A are configured to include a soft magnetic material. The soft magnetic material has a weak coercive force and high magnetic permeability. For example, the soft magnetic material can include iron, silicon steel, penualloy (iron-nickel alloy), sendust (iron-silicon-aluminum alloy), permendur (iron-cobalt alloy), soft ferrite (ceramics containing iron oxide as a main component), amorphous magnetic alloy, and nanocrystalline magnetic alloy.

1-2. Charging Mode

Next, a charging mode for the storage battery incorporated in the case 11A of the portable timepiece 10A will be described. FIG. 3 is a front sectional view illustrating a charging period of the portable timepiece according to the first embodiment. As illustrated in FIG. 3, during the charging period of the portable timepiece 10A, the portable timepiece 10A is mounted on the charging device 40. In this case, the exposure surface of the case back 13 of the portable timepiece 10A faces the charging device 40.

Herein, the charging device 40 will be described. The charging device 40 includes a box-shaped housing 41. The charging device 40 includes a power supply coil 42. The power supply coil 42 is incorporated into the housing 41. The power supply coil 42 has a shape which is substantially the same as the shape of the power receiving coil 21. The power supply coil 42 has a spiral shape. A central opening portion is formed in the center when the power supply coil 42 is viewed in the vertical direction. The power supply coil 42 is formed along a substantially horizontal plane. A shield member 43 is disposed below the power supply coil 42. The shield member 43 restrains a magnetic force line passing through the power supply coil 42 from leaking downward.

The first band 15A in the portable timepiece 10A is folded when the portable timepiece 10A is mounted on the charging device 40. In this case, the first bypass 31A is disposed on a lower side of the central opening portion 21A of the power receiving coil 21. Furthermore, the second bypass 32A and the third bypass 33A are respectively disposed on an outer lower side of the outer edge portion 21B in the power receiving coil 21. The power supply coil 42 disposed in the charging device 40 has substantially the same shape as that of the power receiving coil 21. The power receiving coil 21 and the power supply coil 42 can be disposed at a position where both of these substantially overlap each other in a plan view.

Therefore, the second bypass 32A and the third bypass 33A are disposed outside a position interposed between the power receiving coil 21 and the outer edge portion in the power supply coil 42. The first bypass 31A is disposed at a position interposed between the power receiving coil 21 and the central opening portion in the power supply coil 42. In this way, the first bypass 31A, the second bypass 32A, and the third bypass 33A are disposed at a position where all of these do not overlap the power receiving coil 21 when viewed in the vertical direction.

The second bypass accommodation unit 15A2 during the transformation has a shape in which the second bypass 32A is disposed along the outer edge portion 21B in the power receiving coil 21. The third bypass 33A during the transformation has a shape in which the third bypass 33A is disposed along the outer edge portion 21B in the power receiving coil 21.

If the portable timepiece 10A is mounted on the charging device 40, electricity flows to the power supply coil 42 in the charging device 40, and charging of the portable timepiece 10A starts. If the electricity flows to the power supply coil 42, a magnetic field is generated around the power supply coil 42. If the magnetic field is generated around the power supply coil 42, electromagnetic induction is generated between the power supply coil 42 and the power receiving coil 21 incorporated in the case 11A. The electromagnetic induction generates a current in the power receiving coil 21. The storage battery is charged with the electricity generated by the electricity using the current.

Figure 4A:
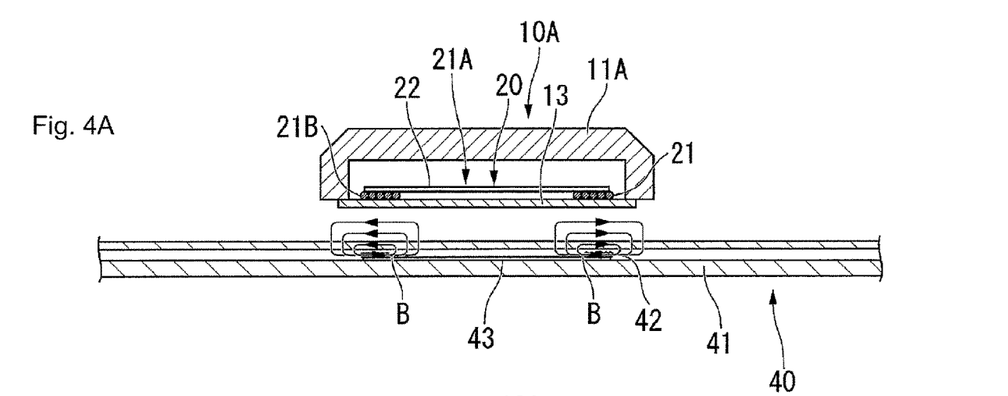
FIG. 4A is a front sectional view of the portable timepiece for describing a magnetic force line in a state where a bypass member is not disposed therein.

Here, a case is assumed in which the first bypass 31A to the third bypass 33A are not disposed in the vertical direction between the power receiving coil 21 and the power supply coil 42. In this case, as illustrated in FIG. 4A, a magnetic force line B of the magnetic field generated from the power supply coil 42 is short. Therefore, the magnetic field generated from the power supply coil 42 is less likely to reach the power receiving coil 21, and thus, charging efficiency is not so satisfactory.

Figure 4B:
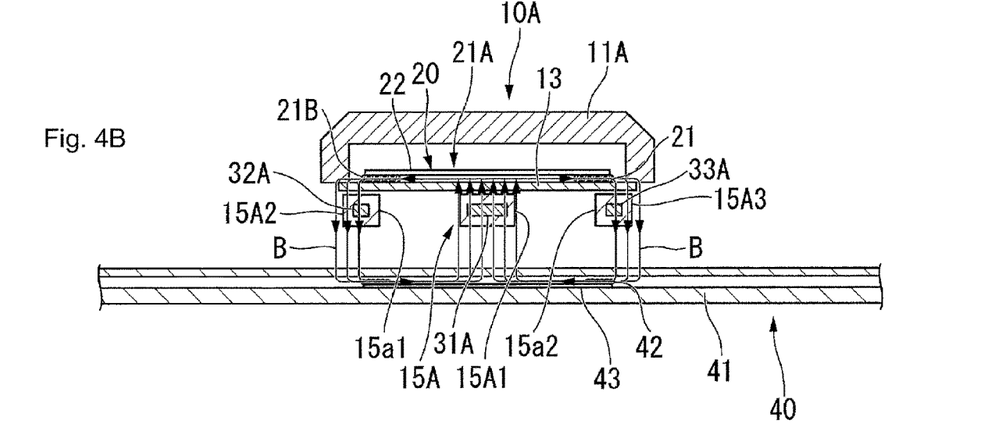
FIG. 4B is a front sectional view of the portable timepiece for describing a magnetic force line in a state where a bypass member is disposed therein.

In this regard, according to the present embodiment, the first bypass 31A to the third bypass 33A which include the soft magnetic material are disposed in the vertical direction between the power receiving coil 21 and the power supply coil 42. The soft magnetic material included in the first bypass 31A to the third bypass 33A has a weak coercive force and high magnetic permeability. Therefore, as illustrated in FIG. 4B, if the first bypass 31A to the third bypass 33A are disposed between the power receiving coil 21 and the power supply coil 42 when viewed in the vertical direction, the magnetic force line B of the magnetic field generated from the power supply coil 42 becomes longer. Therefore, the magnetic field generated from the power supply coil 42 sufficiently reaches the power receiving coil 21, and thus, the magnetic force line B is sufficiently transmitted to the power receiving coil 21.

As a result, when power is supplied to the charging device 40, the electromagnetic induction is strengthened, and the induced electromotive force generated in the power receiving coil 21 increases. Accordingly, it is possible to increase a current generation amount obtained by the electromagnetic induction in the power receiving coil 21. Therefore, it is possible to improve charging efficiency in charging the storage battery.

The first bypass 31A to the third bypass 33A are disposed in the first band 15A which is transformable so as to dispose the first bypass 31A to the third bypass 33A between the power receiving coil 21 and the power supply coil 42. Therefore, a position relationship relative to the power receiving coil 21 can be easily adjusted by adjusting a folding position of the first band 15A. As a result, the first bypass 31A to the third bypass 33A can be easily disposed at a position where the induced electromotive force increases between the power receiving coil 21 and the power supply coil 42.

The electromagnetic shield 22 is disposed above the power receiving coil 21, and the shield member 43 is disposed below the power supply coil 42. Therefore, the magnetic force line B is restrained from leaking upward from the power receiving coil 21 and downward from the power supply coil 42. As a result, as illustrated in FIG. 4B, the magnetic force line B passes through the first bypass 31A and the second bypass 32A, and clearly draws a line between the power supply coil 42 and the power receiving coil 21. Alternatively, the magnetic force line B passes through the first bypass 31A and the third bypass 33A, and clearly draws a line between the power supply coil 42 and the power receiving coil 21. Accordingly, the electromagnetic induction can be further strengthened between the power receiving coil 21 and the power supply coil 42 when viewed in the vertical direction. Therefore, it is possible to further improve the charging efficiency in charging the storage battery.

Incidentally, the charging device has various types. For example, depending on a type of the charging device, a size or a shape of the power supply coil is different from a size or a shape of the power receiving coil 21 in some cases. In this case, it is conceivable that the power receiving coil 21 and the power supply coil are in a state where both of these are less likely to be close to each other. A position for disposing the first bypass 31A to the third bypass 33A can be easily adjusted by adjusting the folding position of the first band 15A in the portable timepiece 10A. Accordingly, even in a case where the power receiving coil 21 and the power supply coil are not close to each other, the bypass member 30A can be easily disposed between the power receiving coil 21 and the power supply coil. Accordingly, even in a case where the charging device and the power receiving coil are less likely to be aligned with each other, it is possible to improve charging efficiency in non-contact charging.

The bypass member 30A is disposed at a position where the bypass member 30A does not overlap the power receiving coil 21 when viewed in the vertical direction. Specifically, the first bypass 31A to the third bypass 33A of the bypass member 30A are respectively disposed between the power receiving coil 21 and the central opening portion of the power supply coil 42 and between the power receiving coil 21 and the outer edge portion of the power supply coil 42. In this way, the bypass member 30A is disposed at a position where the bypass member 30A does not overlap the power receiving coil 21 when viewed in the vertical direction. Therefore, the electromagnetic induction can be further strengthened between the power receiving coil 21 and the power supply coil 42 when viewed in the vertical direction. Accordingly, it is possible to further improve the charging efficiency in charging the storage battery.

In the present embodiment, one piece of first bypass 31A, seven pieces of second bypasses 32A, and seven pieces of third bypasses 33A are disposed as the bypass member 30A. However, one bypass may be disposed as the bypass member. In addition, other multiple pieces of bypasses such as two or three pieces of bypasses may be disposed as the bypass member. The bypass member 30A is disposed on the lower side of the central opening portion 21A of the power receiving coil 21 and the outer lower side of the outer edge portion 21B of the power receiving coil 21. However, the bypass member 30A may be disposed on only the lower side of the central opening portion 21A of the power receiving coil 21 or on only the outer lower side of the outer edge portion 21B of the power receiving coil 21. The bypass member 30A is disposed at the position where the bypass member 30A does not overlap the power receiving coil 21 when viewed in the vertical direction. However, the bypass member 30A may be disposed at a position where the bypass member 30A partially overlaps the power receiving coil 21 when viewed in the vertical direction.

Second Embodiment

Next, a second embodiment according to the present invention will be described.

2-1. Configuration of Portable Timepiece

Figure 5A:
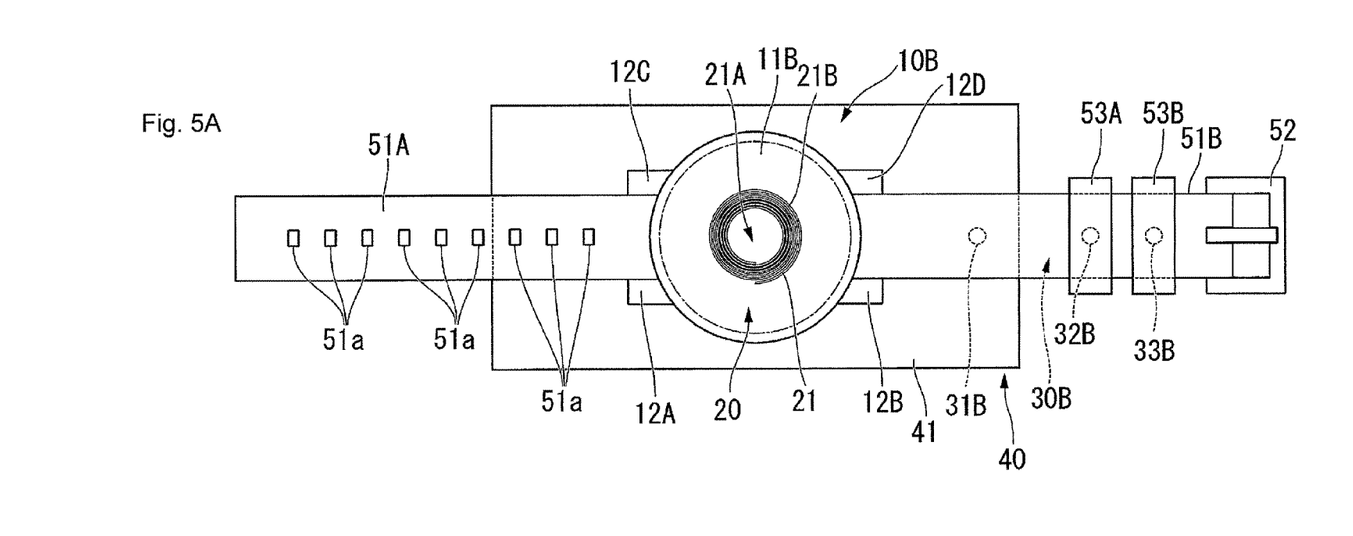
FIG. 5A is a plan view of a portable timepiece according to a second embodiment.
Figure 5B:
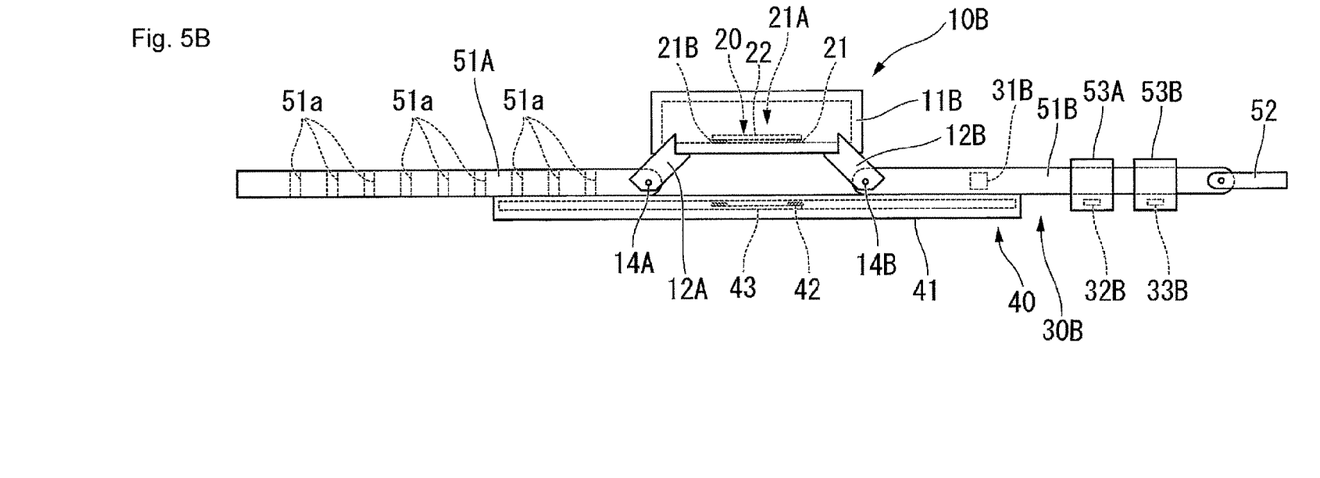
FIG. 5B is a side sectional view of the portable timepiece according to the second embodiment.
Figure 6A:
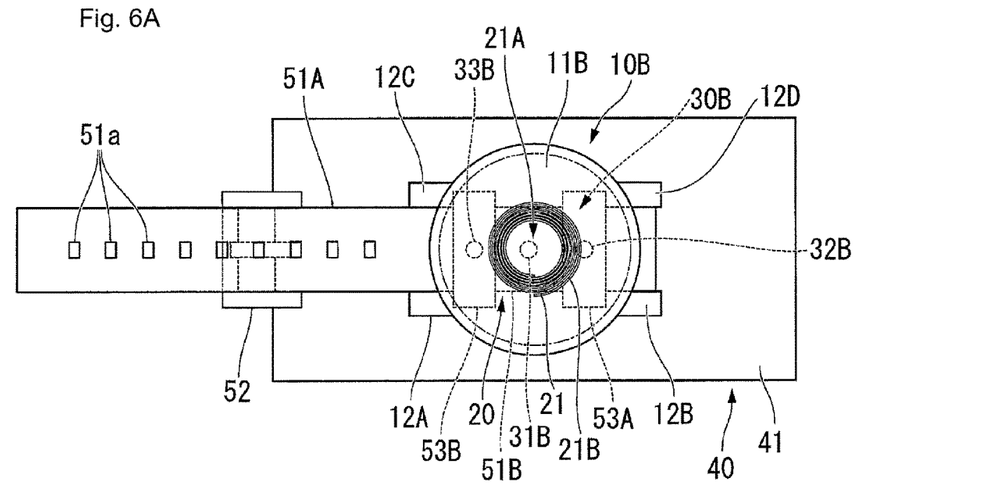
FIG. 6A is a plan view illustrating a charging state of the portable timepiece according to the second embodiment.
Figure 6B:
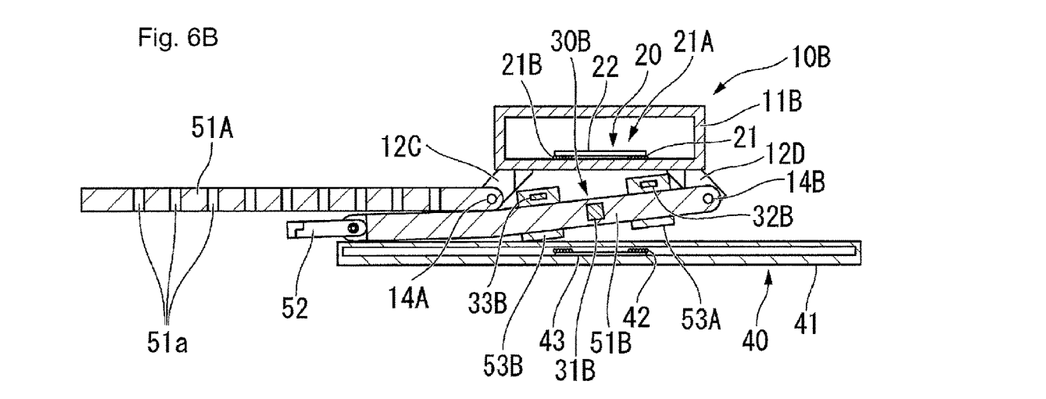
FIG. 6B is a side sectional view illustrating the charging state of the portable timepiece according to the second embodiment.

FIG. 5A is a plan view of a portable timepiece according to the second embodiment, and FIG. 5B is a side sectional view of the portable timepiece according to the second embodiment. FIG. 6A is a plan view illustrating a charging state of the portable timepiece according to the second embodiment, and FIG. 6B is a side sectional view illustrating the charging state of the portable timepiece according to the second embodiment. As illustrated in FIGS. 5A and 5B, a portable timepiece 10B includes a case 11B. A display device is disposed in the case 11B. A movement is incorporated in the case 11B. An antenna 20 is disposed in the case 11B. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment.

The bows 12A to 12D are respectively formed in both end portions of the case 11B. A first band 51A is attached to the bows 12A and 12C on one side in the case 11B by the first pin 14A. A second band 51B is attached to the bows 12B and 12D on the other side by the second pin 14B.

Multiple adjustment holes 51a, 51a, and more are formed in the first band 51A so as to be separated from each other at substantially equal intervals along the extending direction of the first band 51A. A buckle 52 is attached to an end portion opposite to a side to which the case 11B is attached in the second band 51B. The first band 51A and the second band 51B are connected to each other in such a way that the first band 51A is inserted into the buckle 52. The first band 51A and the second band 51B are fixed to each other in such a way that a buckle tongue of the buckle 52 is inserted into any one of the adjustment holes 51a, 51a, and more in the first band 51A.

A first free ring 53A serving as an example of an accessory member and a first free ring according to the present invention is attached to the second band 51B. A second free ring 53B serving as an example of the accessory member and the second free ring according to the present invention is attached to the second band 51B. The first free ring 53A and the second free ring 53B are disposed in the second band 51B by forming one set. The first free ring 53A and the second free ring 53B respectively surround a portion of the second band 51B. Both the first free ring 53A and the second free ring 53B are movable along the extending direction of the second band 51B.

The second band 51B, the first free ring 53A, and the second free ring 53B are internally equipped with a bypass member 30B. Furthermore, the second band 51B is internally equipped with a first bypass 31B. The first free ring 53A is internally equipped with a second bypass 32B. The second free ring 53B is internally equipped with a third bypass 33B.

The first bypass 31B is internally equipped at a position where the first bypass 31B is disposed immediately below the central opening portion 21A in the power receiving coil 21 when the second band 51B is folded at the portion of the bows 12B and 12D. The second bypass 32B is internally equipped at a substantially central position in the width direction in the lower side portion of the first free ring 53A. The third bypass 33B is internally equipped at a substantially central position in the width direction in the lower side portion of the second free ring 53B.

2-2. Charging Mode

When being charged, the portable timepiece 10B according to the second embodiment is mounted on the charging device 40 as illustrated in FIGS. 6A and 6B. The charging device 40 includes the housing 41, the power supply coil 42, and the shield member 43. The charging device 40 is common to that described in the first embodiment.

When the portable timepiece 10B is charged, the second band 51B is folded in the portion of the bows 12B and 12D. A mutual clearance between the first free ring 53A and the second free ring 53B is changed, thereby changing an entire shape of the portable timepiece 10B. Positions for disposing the first free ring 53A and the second free ring 53B are respectively set to the outer lower side of the outer edge portion 21B in the power receiving coil 21.

In the portable timepiece 10B according to the second embodiment, during a charging period, the first bypass 31B is disposed between the power receiving coil 21 and the central opening portion in the power supply coil 42. The second bypass 32B and the third bypass 33B are disposed between the power receiving coil 21 and the outer side of the outer edge portion. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, even in a case where the power supply coil 42 and the power receiving coil 21 are less likely to be aligned with each other in the charging device 40, it is possible to improve charging efficiency in the non-contact charging.

According to the present embodiment, the first free ring 53A is internally equipped with the second bypass 32B, and the second free ring 53B is internally equipped with the third bypass 33B. Therefore, it is possible to easily adjust the clearance between the second bypass 32B and the third bypass 33B. Accordingly, even in a case where a coil is small or conversely large in the charging device, the second bypass 32B and the third bypass 33B are easily disposed at a proper position. Accordingly, even in a case where the charging device and the power receiving coil are less likely to be aligned with each other, the respective positions for disposing the second bypass 32B and the third bypass 33B can be easily adjusted. Therefore, it is possible to improve charging efficiency in the non-contact charging.

Third Embodiment

Next, a third embodiment according to the present invention will be described.

3-1. Configuration of Portable Timepiece

Figure 7A:
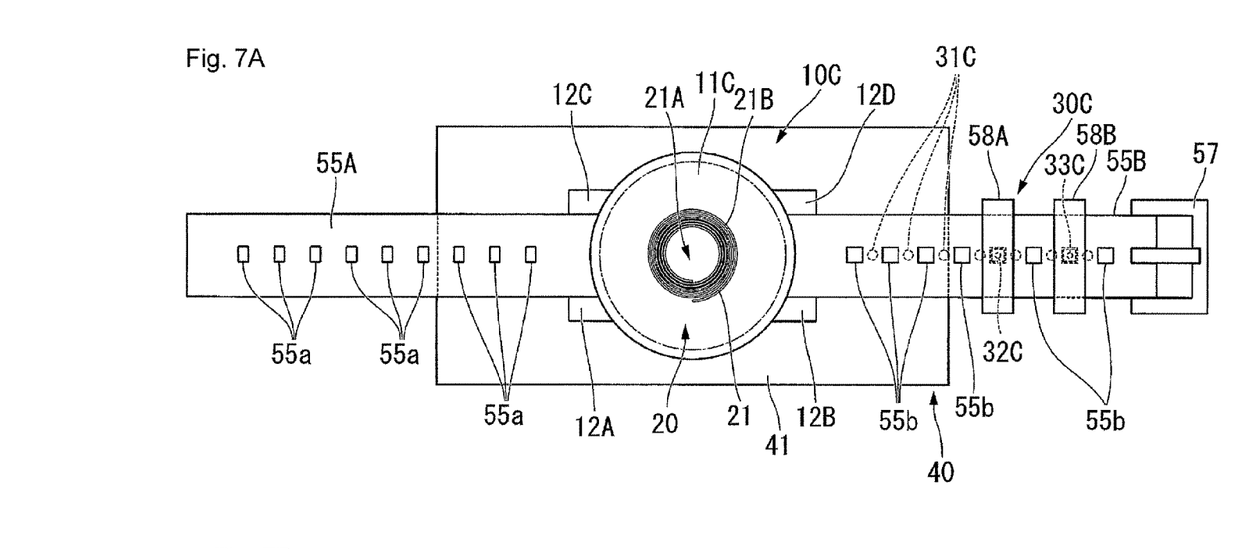
FIG. 7A is a plan view of a portable timepiece according to a third embodiment.
Figure 7B:
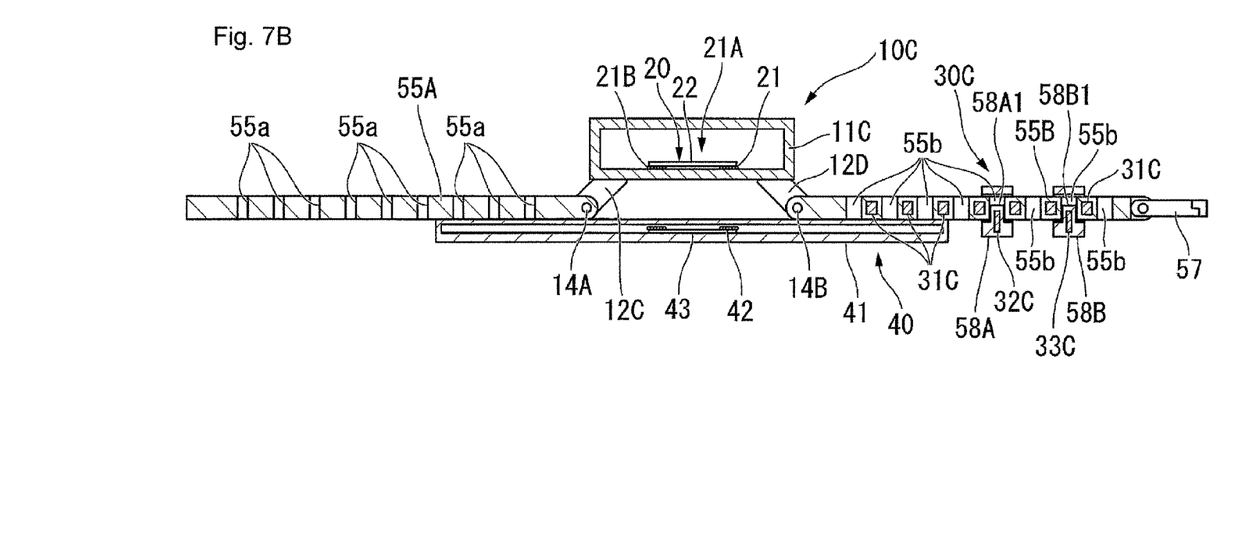
FIG. 7B is a side sectional view of the portable timepiece according to the third embodiment.
Figure 8A:
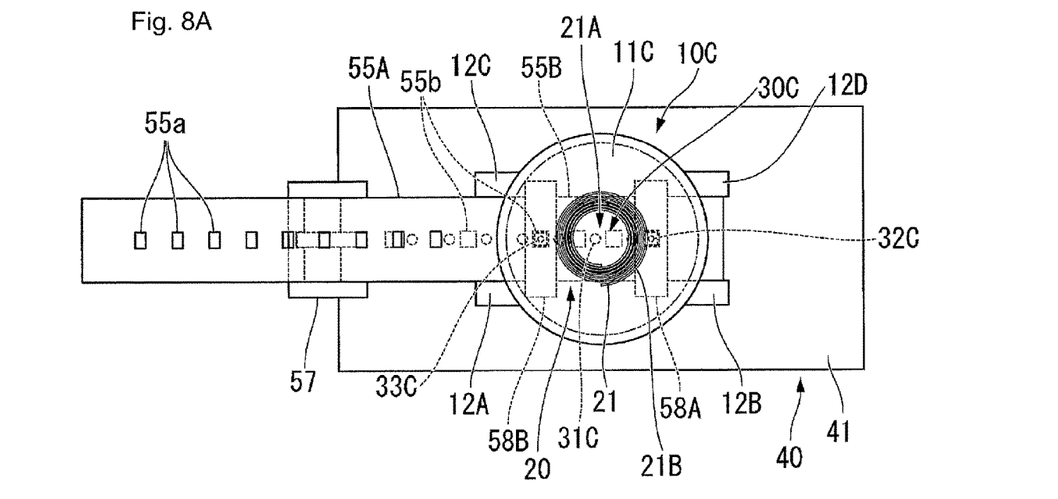
FIG. 8A is a plan view illustrating a charging state of the portable timepiece according to the third embodiment.
Figure 8B:
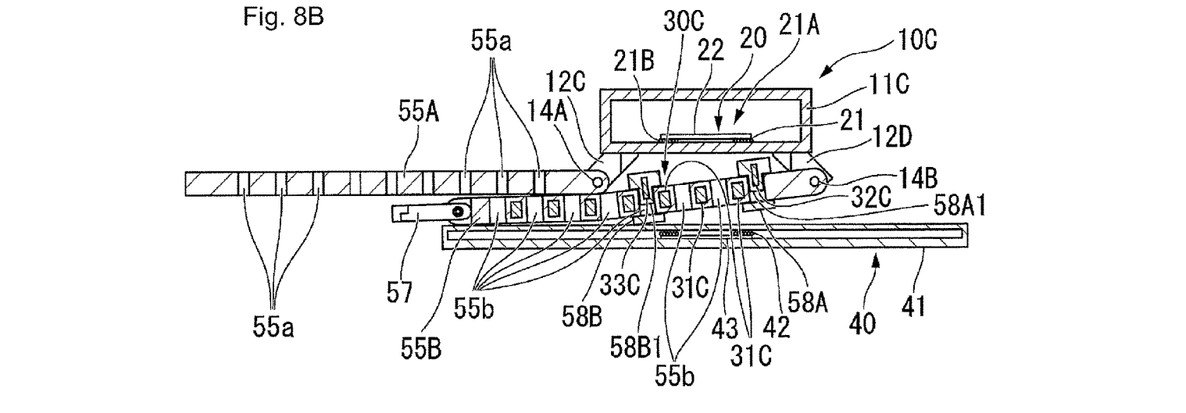
FIG. 8B is a side sectional view illustrating the charging state of the portable timepiece according to the third embodiment.

FIG. 7A is a plan view of a portable timepiece according to the third embodiment, and FIG. 7B is a side sectional view of the portable timepiece according to the third embodiment. FIG. 8A is a plan view illustrating a charging state of the portable timepiece according to the third embodiment, and FIG. 8B is a side sectional view illustrating the charging state of the portable timepiece according to the third embodiment. As illustrated in FIGS. 7A and 7B, a portable timepiece 10C includes a case 11C. A display device is disposed in the case 11C. A movement is incorporated in the case 11C. An antenna 20 is disposed in the case 11C. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment.

The bows 12A to 12D are respectively formed in both end portions of the case 11C. A first band 55A is attached to the bows 12A and 12C on one side in the case 11C by the first pin 14A. A second band 55B is attached to the bows 12B and 12D on the other side in the case 11C by the second pin 14B.

Multiple adjustment holes 55a, 55a, and more are formed in the first band 55A so as to be separated from each other at substantially equal intervals along the extending direction of the first band 55A. A buckle 57 is attached to an end portion opposite to a side to which the case 11C is attached in the second band 55B. A first free ring 58A serving as an example of an accessory member and a first free ring according to the present invention is attached to the second band 55B. A second free ring 58B serving as an example of the accessory member and the second free ring according to the present invention is attached to the second band 55B. The first free ring 58A and the second free ring 58B are disposed in the second band 55B by forming one set. The first free ring 58A and the second free ring 58B respectively surround a portion of the second band 55B. Both the first free ring 58A and the second free ring 58B are movable along the extending direction of the second band 55B.

Furthermore, free ring stationary holes 55b serving as an example of a stationary hole according to the present invention is formed in the second band 55B. The free ring stationary hole 55b is formed at multiple locations in the second band 55B. The multiple free ring stationary holes 55b, 55b, and more are disposed separate from each other at substantially equal intervals along the extending direction of the second band 55B. A first projection portion 58A1 serving as an example of a projection portion according to the present invention, which can be inserted and fitted into the free ring stationary hole 55b, is formed in the first free ring 58A. A second projection portion 58B1 serving as an example of the projection portion according to the present invention, which can be inserted and fitted into the free ring stationary hole 55b, is formed in the second free ring 58B. The first projection portion 58A1 is inserted and fitted into any one of the multiple free ring stationary holes 55b. In this manner, the first free ring 58A is positioned with respect to the second band 55B. Similarly, the second projection portion 58B1 is inserted and fitted into any one of the multiple free ring stationary holes 55b. In this manner, the second free ring 58B is positioned with respect to the second band 55B.

The second band 55B, the first free ring 58A, and the second free ring 58B are internally equipped with a bypass member 30C. Furthermore, the second band 55B is internally equipped with multiple first bypasses 31C, 31C, and more. The first projection portion 58A1 in the first free ring 58A is internally equipped with a second bypass 32C. The second projection portion 58B1 in the second free ring 58B is internally equipped with a third bypass 33C.

Each position of the multiple first bypasses 31C internally equipped in the second band 55B is located between the free ring stationary holes 55b and 55b which are adjacent to each other. The second bypass 32C and the third bypass 33C are respectively and internally equipped at a substantially central position when viewed in the vertical direction of the first projection portion 58A1 and the second projection portion 58B1.

3-2. Charging Mode

When being charged, the portable timepiece 10C according to the third embodiment is mounted on the charging device 40 as illustrated in FIGS. 8A and 8B. The charging device 40 includes the housing 41, the power supply coil 42, and the shield member 43. The charging device 40 is common to that described in the first embodiment.

When the portable timepiece 10C is charged, the second band 55B is folded in the portion of the bows 12B and 12D. A mutual clearance between the first free ring 58A and the second free ring 58B is changed, thereby changing an entire shape of the portable timepiece 10C. Positions for disposing the first free ring 58A and the second free ring 58B are respectively set to the outer lower side of the outer edge portion 21B in the power receiving coil 21.

In the portable timepiece 10C according to the third embodiment, during a charging period, the first bypass 31C is disposed between the power receiving coil 21 and the central opening portion in the power supply coil 42. The second bypass 32C and the third bypass 33C are disposed between the power receiving coil 21 and the outer side of the outer edge portion. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, even in a case where the power supply coil 42 and the power receiving coil 21 are less likely to be aligned with each other in the charging device 40, it is possible to improve charging efficiency in the non-contact charging.

According to the present embodiment, the first free ring 58A is internally equipped with the second bypass 32C, and the second free ring 58B is internally equipped with the third bypass 33C. Therefore, it is possible to easily adjust the clearance between the second bypass 32C and the third bypass 33C. Accordingly, even in a case where a coil is small or conversely large in the charging device, the second bypass 32C and the third bypass 33C are easily disposed at a proper position. Accordingly, even in a case where the charging device and the power receiving coil are less likely to be aligned with each other, the respective positions for disposing the second bypass 32C and the third bypass 33C can be easily adjusted. Therefore, it is possible to improve charging efficiency in the non-contact charging.

The first projection portion 58A1 of the first free ring 58A and the second projection portion 58B1 of the second free ring 58B, which are internally equipped with the second bypass 32C and the third bypass, are inserted and fitted into the free ring stationary hole 55b formed in the second band 55B. Therefore, the second bypass 32C and the third bypass 33C can be prevented from moving. The first bypass 31C is disposed between the free ring stationary holes 55b and 55b which are adjacent to each other. Therefore, the first bypass 31C can be easily disposed between the second bypass 32C and the third bypass 33C.

Fourth Embodiment

Next, a fourth embodiment according to the present invention will be described.

4-1. Configuration of Portable Timepiece

Figure 9A:
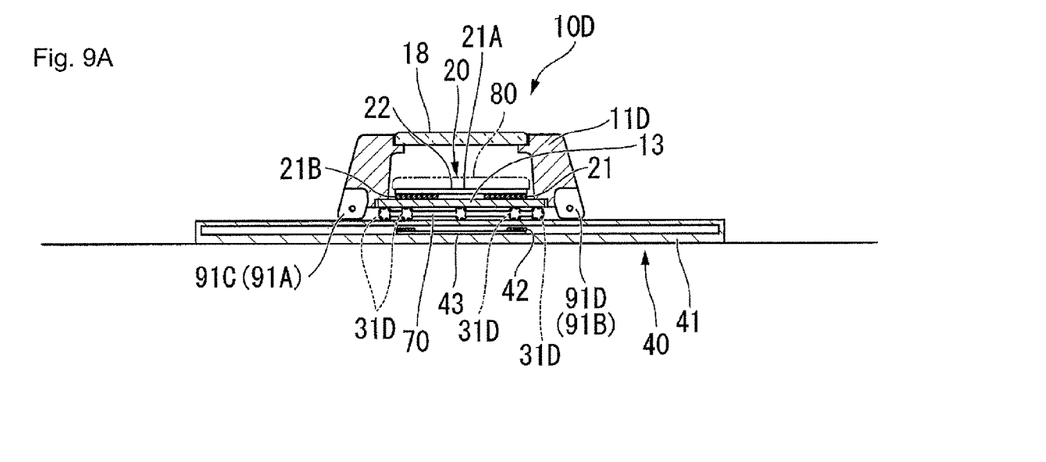
FIG. 9A is a side sectional view illustrating a charging state of a portable timepiece according to a fourth embodiment.
Figure 9B:
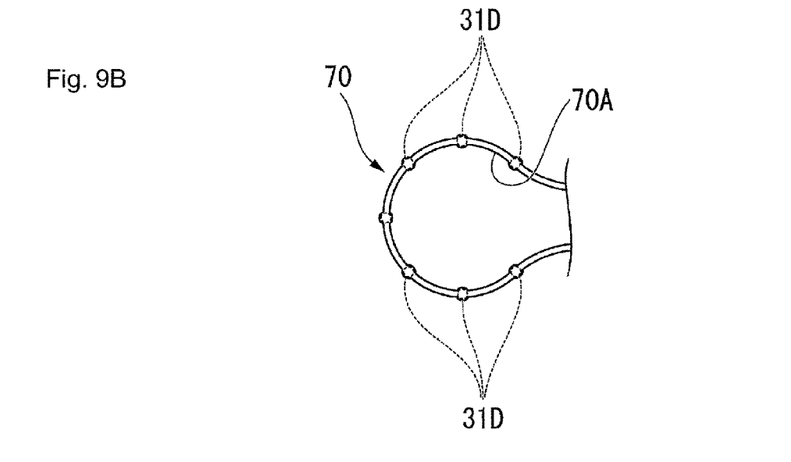
FIG. 9B is a plan view of a band.

FIG. 9A is a side sectional view illustrating a charging state of a portable timepiece according to the fourth embodiment, and FIG. 9B is a plan view of a band. As illustrated in FIGS. 9A and 9B, a portable timepiece 10D includes a case 11D. The windshield glass 18 is disposed in the case 11D. A movement (not illustrated) is incorporated in the case 11D. An antenna 20 is disposed in the case HD. The antenna 20 includes the power receiving coil 21 and the electromagnetic shield 22. The central opening portion 21A is formed in the center of the power receiving coil 21. The outer edge portion 21B is formed in the power receiving coil 21. The antenna 20 is common to the antenna 20 described in the first embodiment. The storage battery 80 is mounted on the antenna 20.

An opening portion is Rained on the rear surface side of the case 11D. A case back 13 is attached to the opening portion. The case back 13 closes the opening portion. A first band attachment portion 91A to a fourth band attachment portion 91D are respectively disposed at four corners on the rear surface side of the case 11D. All of the first band attachment portion 91A to the fourth band attachment portion 91D have the same shape. In FIGS. 9A and 9B, the first band attachment portion 91A is located at the front position of the third band attachment portion 91C. The second band attachment portion 91B is located at the front position of the fourth band attachment portion 91D. A strap-like band 70 serving as an example of a strap-like band according to the present invention is attached to the first band attachment portion 91A to the fourth band attachment portion 91D.

As illustrated in FIG. 9B, the band 70 includes a band main body 70A. Bypass positions are formed at substantially equal intervals in the extending direction of the band main body 70A. Bypasses 31D are respectively and internally equipped at the bypass positions in the band main body 70A. The bypasses 31D are formed of the soft magnetic material, similarly to the respective embodiments.

4-2. Charging Mode

When being charged, the portable timepiece 10D according to the fourth embodiment is mounted on the charging device 40 as illustrated in FIG. 9A. The charging device 40 includes the housing 41, the power supply coil 42, and the shield member 43. The charging device 40 is common to that described in the first embodiment.

In the portable timepiece 10D according to the fourth embodiment, when being charged, the band main body 70A in the band 70 is properly transformed, and the bypasses 31D including the soft magnetic material are disposed between the power receiving coil 21 and the power supply coil 42. Therefore, the magnetic force line of the magnetic field generated from the power supply coil 42 is sufficiently transmitted to the power receiving coil 21. Accordingly, it is possible to increase a current generation amount obtained by the electromagnetic induction in the power receiving coil 21. As a result, it is possible to improve charging efficiency in charging the storage battery. Since the band 70 has a strap shape, it is possible to easily adjust a position for disposing the bypasses 31D.

The present invention is not limited to the embodiments described above with reference to the drawings, and various modification examples are conceivable within the technical scope of the present invention.

In the respective embodiments, an example has been described in which the portable timepieces 10A to 10D are employed as the portable device. However, as long as the portable device includes a charging antenna, the portable device is not limited to the portable timepieces 10A to 10D. Accordingly, for example, the present invention is also applicable to other portable devices such as a heart rate monitor and a body composition meter. As the accessory member, the band and the free ring of the portable timepiece have been described as an example. However, other accessory members may be employed. For example, a pulling unit may be disposed in the case. The pulling unit may be used as the accessory member, and the accessory member may be internally equipped with the bypass member.

Alternatively, within the scope not departing from the gist of the present invention, the configuration elements in the above-described embodiments can be appropriately replaced with known configuration elements.

What is claimed is:

1. A portable device comprising:
    a case;
    a power receiving coil accommodated in the case;
    a bypass member that includes pieces of soft magnetic materials; and
    an accessory member that is attached to the case and includes the bypass member inside the accessory member, the accessory member being transformable in shape so as to have the bypass member disposed adjacent to the power receiving coil between the power receiving coil and a charging device, wherein the bypass member facilitates formation of magnetic circuits between the power receiving coil and the charging device when the case is placed on the charging device, and the charging device transmits electromagnetic energy toward the power receiving coil.

2. The portable device according to claim 1,
    wherein the power receiving coil arranged in a plane in the case so that it faces the charging device when the case is placed on the charging device, the power receiving coil having an opening portion in a center thereof, and
    wherein the accessory member is transformable in shape so as to have the bypass member positioned so that the bypass member and the power receiving coil do not overlap each other when viewed in an axial direction orthogonal to the plane.

3. The portable device according to claim 2, wherein the accessory member is transformable in shape so as to have at least one piece of soft magnetic materials of the bypass member positioned in the opening portion of the power receiving coil and have other pieces of soft magnetic materials of the bypass member positioned along an outer peripheral of the power receiving coil when viewed in the axial direction orthogonal to the plane.

4. A portable timepiece comprising:
    a timepiece main body;
    a power receiving coil accommodated in the timepiece main body on a rear surface side of the timepiece main body;
    a bypass member that includes pieces of soft magnetic materials; and
    an accessory member that is attached to the timepiece main body and includes the bypass member inside of the accessory member, the accessory member being transformable in shape so as to have the bypass member positioned adjacent to the power receiving coil between the power receiving coil and a charging device, wherein the bypass member facilitates formation of magnetic circuits between the power receiving coil and the charging device when the timepiece main body is placed on the charging device, and the charging device transmits electromagnetic energy toward the power receiving coil.

5. The portable timepiece according to claim 4, wherein the accessory member comprises a band including a portion that is transformable in shape so as to have the bypass member positioned adjacent to the power receiving coil.

6. The portable timepiece according to claim 4, wherein said portion of the accessory member comprises a first free ring and a second free ring both of which are attached to the band so as to be movable along the band to change a distance between the first and second free rings along the band.

7. The portable timepiece according to claim 6, further comprising:
    a projection portion provided in at least any one of the first free ring and the second free ring; and
    at least one stationary hole that is formed in the band, wherein the projection portion can be inserted in the at least one stationary hole.

8. The portable timepiece according to claim 4, wherein the accessory member comprises a strap-like band attached to the timepiece main body.

9. The portable timepiece according to claim 4,
    wherein the power receiving coil is formed in a plane inside the timepiece main body so that it faces the charging device when the timepiece main body is placed on the charging device, the power receiving coil having an opening portion in a center thereof, and
    wherein the accessory member is transformable in shape so as to have the bypass member positioned so that the bypass member and the power receiving unit do not overlap each other when viewed in an axial direction orthogonal to the plane.

10. The portable timepiece according to claim 9, wherein the accessory member is transformable in shape so as to have at least one pieces of the soft magnetic materials of the bypass member positioned in the opening portion of the power receiving coil and other pieces of the soft magnetic materials of the bypass member positioned adjacent to an outer peripheral of the power receiving coil.

* * * * *

UNITED STATES PATENT AND TRADEMARK OFFICE
CERTIFICATE OF CORRECTION

PATENT NO. : 10,291,058 B2
APPLICATION NO. : 15/450626
DATED : May 14, 2019
INVENTOR(S) : Teruo Kato et al.

It is certified that error appears in the above-identified patent and that said Letters Patent is hereby corrected as shown below:

In the Claims

In Column 16, Claim 7, Line 52, delete "that is".

Signed and Sealed this
Third Day of November, 2020

Andrei Iancu
*Director of the United States Patent and Trademark Office*